United States Patent [19]

Kobayashi

[11] 4,163,916

[45] Aug. 7, 1979

[54] MOTOR BRUSH

[75] Inventor: Minoru Kobayashi, Hachioji, Japan

[73] Assignee: Olympus Optical Company Ltd., Tokyo, Japan

[21] Appl. No.: 844,128

[22] Filed: Oct. 20, 1977

[30] Foreign Application Priority Data

Oct. 22, 1976 [JP] Japan .......................... 51/142168[U]

[51] Int. Cl.$^2$ .............................................. H02K 13/00

[52] U.S. Cl. .................................... 310/246; 310/241; 310/248; 310/242

[58] Field of Search ............... 310/244, 241, 232, 245, 310/246, 247, 242, 148, 229, 230, 248-253, 239; 339/5 M

[56] References Cited

U.S. PATENT DOCUMENTS

| | | | |
|---|---|---|---|
| 2,451,959 | 10/1948 | Knudsen | 310/244 |
| 2,818,518 | 12/1957 | Phaneuf | 310/237 |
| 2,931,999 | 5/1960 | Lemmerman | 310/232 |
| 3,226,666 | 12/1965 | Lord | 310/232 |
| 3,564,168 | 2/1971 | Bigg | 310/232 |
| 3,705,996 | 12/1972 | Ahmed | 310/232 |

*Primary Examiner*—R. Skudy

*Attorney, Agent, or Firm*—Toren, McGeady and Stanger

[57] ABSTRACT

A motor brush for use in a miniature motor comprises a coil spring having both end portions extended to the outside, a contact member secured to the one end portion of the coil spring and biased to contact with a commutator by spring force, a stop member provided at a support member in a motor case for stopping the other end portion of the coil spring, and a column body secured to the support member for supporting the coil spring.

3 Claims, 6 Drawing Figures

MOTOR BRUSH

BACKGROUND OF THE INVENTION

The present invention relates to a motor brush for use in a miniature motor.

In a super-miniature motor used in a small size tape recorder a motor brush uses a leaf spring which has to make its spring constant small because of space limitation.

SUMMARY OF THE INVENTION

An object of the present invention is to provide improved motor brush adaptable to a super-miniature motor.

According to a feature of the present invention, the object is attained in whole or in part, by combining a plurality of coil springs and fixing contact members to extended end portions of each spring wire member.

The present invention provides an improved motor brush in which a plurality of spring wire materials are aligned almost in parallel and wound in coil, both end portions of each spring wire material are extended to the outside, a contact member is secured to the one extended end portion of the spring wire, the extended portion at the other end of the wound spring wire is supported under the state of abutting to a stopper within a motor case, and the contact member is biased in the direction of contacting with the commutator. A column body for supporting the coil spring is secured to a support member by screw. The coil spring is formed by previously joining a plurality of linear spring wires at several portions by spot welding or with the use of an adhesive to make adjacent parallel state, and by forming the jointed wire in a coil. The spring is formed by joining a plurality of linear spring wires with the use of an adhesive or a paint during winding formation and by making into a composite coil. The coil spring is so formed that a plurality of linear spring wires are formed in coil by pitch winding and the thus wound coils are combined by mutually twisting with each other. The coil spring is so constructed that a plurality of linear spring wires are respectively wound in a separate coil spring member and these coil spring members are stacked one on the other on the supporting column body to make a composite coil spring.

Other objects and advantages of the present invention will become evident from the following detailed description when read in light of the accompanying drawings.

BRIEF DESCRIPTION OF PREFERRED EMBODIMENTS

Figure 1:
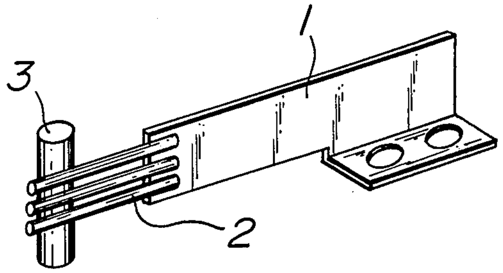
FIG. 1 PRIOR ART
FIGS. 1 and 2 are perspective views showing different embodiments of conventional motor brush.

A conventional motor brush, as shown in FIG. 1, has such a construction that a leaf spring 1 is used, the leaf spring 1 is made long as possible for making a spring constant small and a contact member 2 is welded to the end of the leaf spring and further made into contact with a rectifier 3 of the motor by spring force of the leaf spring 1. In a super-miniature motor used in a small size tape-recorder and the like, however, a space is limited, so that the leaf spring 1 cannot be formed long, and thus a problem arises in spring constant, and a life of the motor is shortened.

Figure 2:
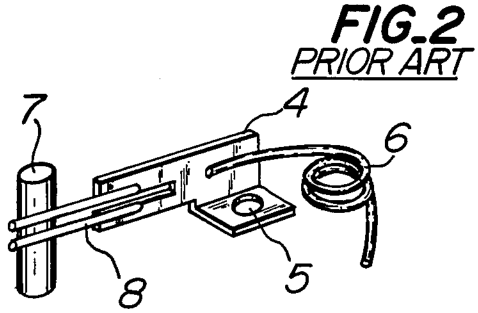
FIG. 2 PRIOR ART

In another conventional motor brush, as shown in FIG. 2, there is such a construction that a base plate 4 for holding a contact member 8 having a rotatable center portion 5 is biased on the side of a commutator 7 by another coil spring 6 and the contact member 8 welded to a top end of the base plate 4 is made into contact with the commutator 7 by its biasing force. However, a motor brush having this construction requires many parts, much labor and expenses.

The present invention has been invented by noting the above conditions, and is to provide a motor brush adaptable to a super-miniature motor, which can simply be constructed by combining a plurality of coil springs and fixing contact members to extended end portions of each spring wire member without requiring any leaf spring or a base plate for holding a contact member, thereby making a spring constant small and providing a plurality of contact members.

Figure 3:
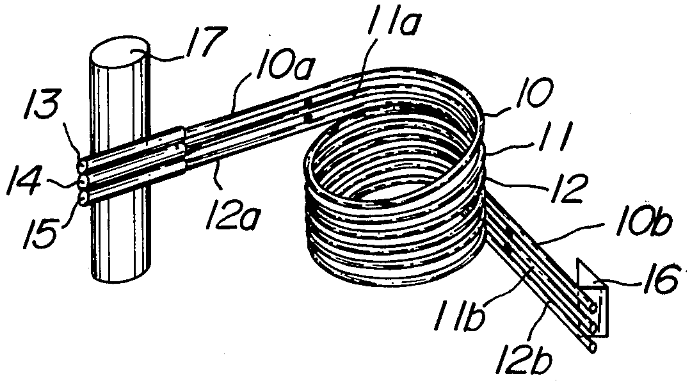
FIG. 3 is a perspective view of one embodiment of the present invention.

An embodiment of the present invention will be explained with reference to FIG. 3. In this embodiment, coil springs 10, 11 and 12 formed by winding three wire members are used, and these oil springs 10, 11 and 12 have composite construction by arranging respective spring wire members in parallel on the same axis. As material of the coil springs 10, 11 and 12, use may be made of, for example, phosphorus bronze. The composite coil springs 10, 11 and 12 are provided with extended portions 10*a*, 11*a*, 12*a*, 10*b*, 11*b* and 12*b* linearly extended to the outside at both ends of each spring wire member.

At each end portion of the extended portions 10*a*, 11*a* and 12*a* are secured contact members 13, 14 and 15 of noble metal by welding. As contact members 13, 14 and 15, use may be made of a silver palladium alloy, an alloy consisting of gold (70%), silver and platinum, and the like.

The extended portions 10*b*, 11*b* and 12*b* on the other end are supported under the state of abutting with a stopper 16 in a motor case (not shown), and biasing forces of the composite coils 10, 11 and 12 generated therefrom keep into contact each contact member 13, 14 and 15 with a commutator 17 of the motor.

Figure 4A:
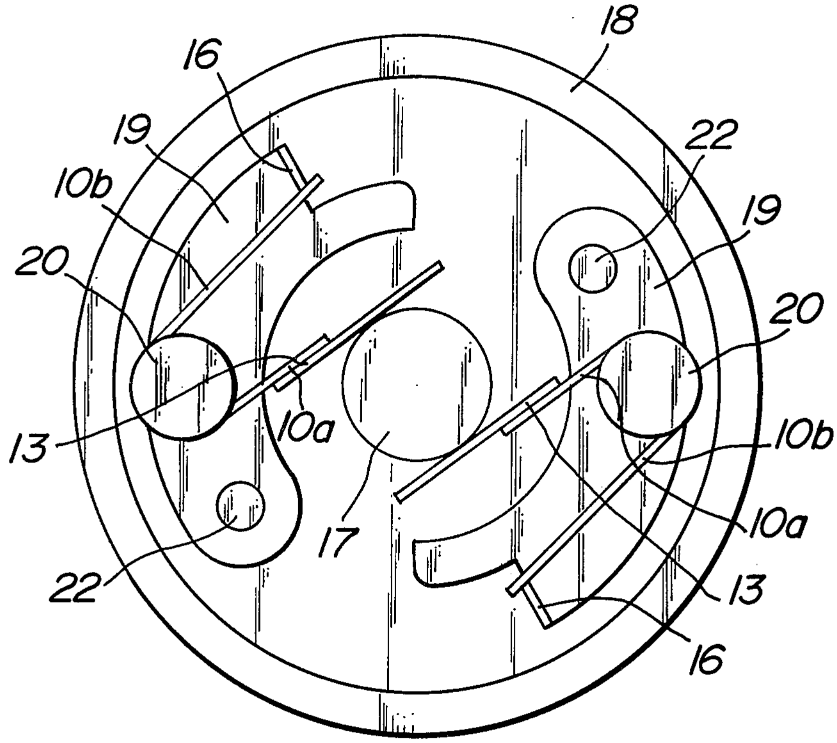
FIG. 4*a* is a plan view showing the state of securing the motor brush to the side plate of the motor.
Figure 4B:
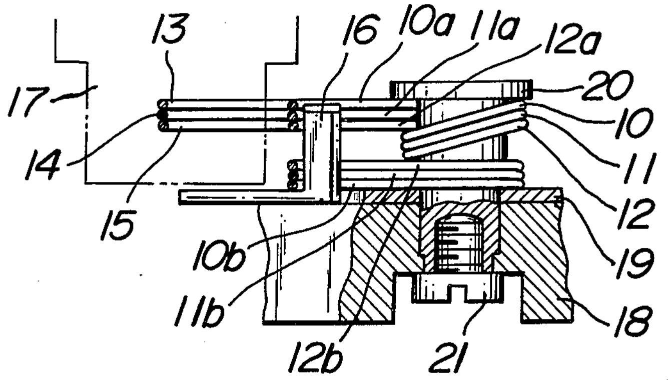
FIG. 4*b* is a vertical cross section thereof.

The present invention will be further explained with reference to FIGS. 4*a* and 4*b*, in which reference numeral 18 is an end plate of a motor having the shape of almost a disc made of for example synthetic resin and the above-described coil springs 10, 11 and 12 are mounted on this end plate 18. That is, a pair of arc-shaped metal support members 19, 19 are mounted on both sides so as to sandwich the commutator 17, and supporting column bodies 20,20 are extended through the support member at the proper positions and fixed by screws 21,21, respectively. At one end of the support members 19, 19 are formed holes 22, 22, while at the other end thereof are formed stoppers 16,16.

The coil springs 10, 11 and 12 are mounted around the supporting column body 20 by its coil portion, and the extended portions 10*b*, 11*b* and 12*b* are abutted with the stopper 16, thereby contacting contact members 13, 14 and 15 provided on the extended portions 10*a*, 11*a* and 12*a* at the other end with the commutator 17.

The above composite coil springs 10, 11 and 12 can easily be obtained by joining each of linear spring wire materials before formation at several portions by spot welding or strong adhesive to make the adjacent parallel state, and forming them into coil shape by means of a coil winding machine.

The spring wire materials can be combined with each other by an adhesive or paint during formation of the spring wire material by means of the coil winding machine.

The coil springs 10, 11 and 12 can also be obtained by mutually twisting each spring formed separately by pitch winding with each other to form one unit.

Figure 5:
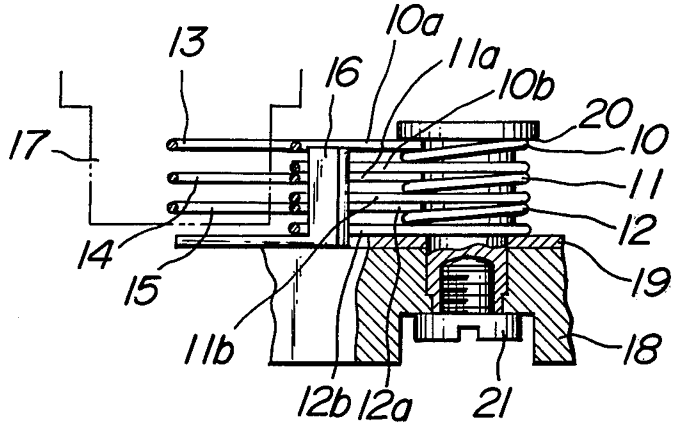
FIG. 5 is a vertical cross section showing different construction of the brush corresponding to FIG. 4*b*.

The present invention can perform similar effect not only in case of directly contacting the coil springs 10, 11 and 12 with each other and winding and combining them in one unit but also in case of literally aligning three units of the coil springs on the supporting column body 20 as shown in FIG. 5. In addition, in FIG. 5 the same reference numerals shown in FIG. 4*b* are employed for the convenience' sake.

As explained above, the present invention is made by arranging a plurality of coil springs on the same axis, extending their ends to the outside and securing contact members to the extended end portions, so that there is no problem of a spring constant which is often caused in the conventional one with the use of a leaf spring. The motor brush according to the present invention has a small spring constant which is adaptable for a superminiature motor and a life of the motor can be prolonged. Further, as compared with the other conventional brush in which a base for holding a contact member is biased by another coil spring, a number of components can be minimized, so that the simplified construction and the easy manufacture are obtained. Further, the coil spring having the above composite construction can absorb oscillation by the spring effect of the coil spring itself, so that it can contribute to anti-oscillation effect of the motor.

The present invention is not limited to the above embodiment but can be modified within the scope of not varying the essential feature of the present invention.

What is claimed is:

1. A brush assembly for an electric motor including a commutator and a motor case comprising: a spring assembly formed of a plurality of individual spring wire members wound together in a helical configuration and having first and second ends extending together tangentially outwardly of said helical configuration, said spring wire members being mounted together in generally parallel extending relationship to form said spring assembly as a composite spring unit having a central coil portion with first and second extended portions defined, respectively, by said first and second ends of said spring wire members; electrical contact means affixed to said first extended portion of said composite spring unit; support means comprising a support column affixed to said motor case and stop means arranged for engagement with said second extended portion of said composite spring unit; said composite spring unit being loosely mounted on said support column with said central coil portion thereof extending completely around said support column, with said electrical contact means in engagement with said commutator and with said second extended portion engaged against said stop means; said stop means being arranged to engage said second extended portion of said composite spring unit to hold said spring unit in spring compression between said commutator and said stop means with said composite spring unit being thereby held in place upon said support column to effect commutation of said motor.

2. An assembly according to claim 1 wherein said individual spring wire members are spot welded together to form said composite spring unit.

3. An assembly according to claim 1 wherein said individual spring wire members are joined together by an adhesive to form said composite spring unit.

* * * * *